(12) United States Patent
Doolittle et al.

(10) Patent No.: US 8,505,131 B2
(45) Date of Patent: *Aug. 13, 2013

(54) TRENCH DRAIN SYSTEM AND METHOD OF INSTALLATION ON LEVEL FLOOR SURFACE, PATICULARY FOR SHOWER ROOMS

(75) Inventors: Mark E. Doolittle, Huntington, IN (US); Jeffrey Harmon, Fort Wayne, IN (US)

(73) Assignee: Perimedrain Systems, LLC, Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,791

(22) Filed: Jan. 13, 2012

(65) Prior Publication Data

US 2012/0110827 A1   May 10, 2012

Related U.S. Application Data

(63) Continuation-in-part of application No. 12/844,660, filed on Jul. 27, 2010, now abandoned.

(51) Int. Cl.
*A47K 3/34* (2006.01)
(52) U.S. Cl.
USPC ................................. 4/613; 404/2; 405/118
(58) Field of Classification Search
USPC ........ 4/613; 52/12; 210/163–166; 405/118; 404/2
See application file for complete search history.

(56) References Cited

U.S. PATENT DOCUMENTS

| | | |
|---|---|---|
| 1,854,443 A | 4/1932 | Barce |
| 1,859,017 A | 5/1932 | Barce |
| 2,106,516 A | 1/1938 | Cheney |
| 2,449,323 A | 9/1948 | Richterkessing |
| 3,457,568 A | 7/1969 | Amatruda |
| 4,541,132 A | 9/1985 | Long |
| 4,640,643 A | 2/1987 | Williams |
| 4,777,675 A | 10/1988 | Letner |
| 4,974,269 A | 12/1990 | Baus |
| 4,978,250 A | 12/1990 | Dallmer |
| 5,023,965 A | 6/1991 | Reichel |
| 5,026,202 A | 6/1991 | Thomann |
| 5,213,438 A | 5/1993 | Barenwald |
| 5,243,716 A | 9/1993 | Zaccai et al. |
| 5,243,798 A | 9/1993 | Elliott |
| 5,458,769 A | 10/1995 | Johannessen |
| 5,501,547 A | 3/1996 | Mantelli |
| 5,613,804 A * | 3/1997 | Beamer .................... 405/118 |
| 5,718,008 A | 2/1998 | Pane |
| 5,911,518 A | 6/1999 | Jurek et al. |
| 6,027,283 A | 2/2000 | Schweinberg et al. |
| 6,129,838 A | 10/2000 | Millner |

(Continued)

*Primary Examiner* — Tuan N Nguyen
(74) *Attorney, Agent, or Firm* — George Pappas

(57) ABSTRACT

A trench drain system and method of installation thereof on a level floor surface. An elongate channel member is placed on the floor surface. A preformed elongate sloping member having a thick end tapering to a thin end in inserted into the channel with its thin end closest to the channel drain opening, thereby forming an inclined sloping surface. A grate extends over the channel inlet. The area adjacent the channel is filled to the height of the channel, whereby water thereon flows through the grate into the channel, along the inclined surface and out through the drain opening. The channel can be placed adjacent a vertical wall whereby wall tile may be installed over a channel top edge. The floor area adjacent the channel is filled with preformed sloping sheet members or with plastically formable material positioned at an incline using a floor height setting post.

52 Claims, 11 Drawing Sheets

(56) References Cited

U.S. PATENT DOCUMENTS

| | | |
|---|---|---|
| 6,381,773 B1 | 5/2002 | McAllister |
| 6,571,406 B2 | 6/2003 | Gerloff |
| 6,612,780 B2 | 9/2003 | Dahowski et al. |
| 6,725,470 B2 | 4/2004 | Webb |
| 6,941,703 B2 | 9/2005 | MacLean et al. |
| 7,507,054 B2 | 3/2009 | Fithian et al. |
| 7,694,358 B2 | 4/2010 | Stimpson |
| 2003/0033668 A1 | 2/2003 | Pane |
| 2005/0025572 A1 | 2/2005 | Sanfilippo et al. |
| 2005/0050628 A1 | 3/2005 | Mascheroni |
| 2005/0204683 A1 | 9/2005 | Showers et al. |
| 2005/0223485 A1 | 10/2005 | Nijhof |
| 2006/0213006 A1 | 9/2006 | Rush, Jr. et al. |
| 2006/0236452 A1 | 10/2006 | Polimeno |
| 2007/0067903 A1 | 3/2007 | Hatrick-Smith |
| 2008/0078068 A1 | 4/2008 | Cervantes |
| 2008/0163419 A1 | 7/2008 | Nishi |
| 2008/0276364 A1 | 11/2008 | Barro et al. |
| 2009/0139022 A1 | 6/2009 | Luxton |
| 2009/0202302 A1 | 8/2009 | Koenig et al. |
| 2009/0235449 A1 | 9/2009 | Lin |
| 2009/0320204 A1 | 12/2009 | Wiseman et al. |
| 2010/0162481 A1* | 7/2010 | Erlebach .......................... 4/613 |
| 2011/0162137 A1 | 7/2011 | Kik, Sr. et al. |

* cited by examiner

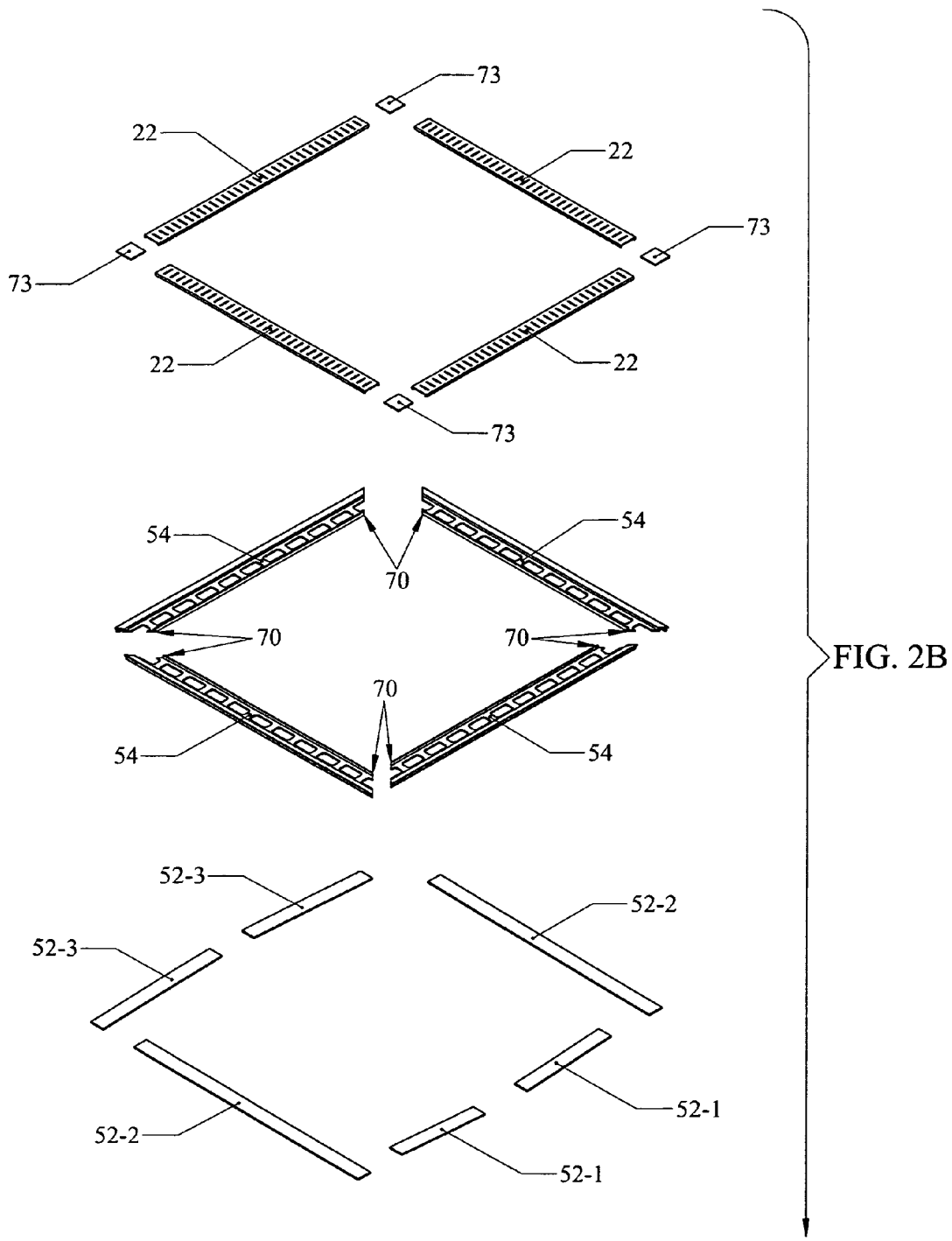

TRENCH DRAIN SYSTEM AND METHOD OF INSTALLATION ON LEVEL FLOOR SURFACE, PATICULARY FOR SHOWER ROOMS

CROSS REFERENCE TO RELATED APPLICATIONS

This application is a continuation-in-part of and claims priority of application Ser. No. 12/844,660 filed on Jul. 27, 2010 now abandoned entitled Perimeter Drainage System for Showers, the disclosure of which is hereby incorporated herein by reference.

BACKGROUND OF THE INVENTION

1. Field of the Invention

The present invention relates to the field of trench drains. More particularly, the present invention relates to trench drain systems that can be installed on level floor surfaces.

2. Background

Floors of shower rooms, garages, driveways, etc. are today often equipped with trench drains for drainage of water therefrom. The floor must be installed with a slope toward the trench drain whereby water on the floor may flow toward and into the trench drain. The trench drain must similarly be sloped toward an opening so that water falling into the trench drain may travel to and flow out through the trench drain outlet. The installation of a trench drain system with a proper floor slope to the trench drain and a proper trench drain slope to its outlet can be difficult and burdensome, especially when the trench drain must be installed over an existing level floor surface. Accordingly a need exists for an improved trench drain system and method of installation on level floor surfaces which is relatively easy to install and reliable, particularly for shower rooms.

SUMMARY OF THE INVENTION

In one form thereof the present invention is directed to a method of installing a trench drain on a level floor surface comprising the steps of: placing an elongate channel member on the floor surface, the channel member having a bottom surface, side walls extending upwardly therefrom to side walls top edges, a channel inlet between the side walls top edges and a drain opening; inserting a preformed elongate sloping member having a thick end tapering to a thin end into the channel on the bottom surface with the thin end closest to the channel drain opening, the sloping member forming an inclined surface sloping toward the drain opening; and, filling an area adjacent the channel over the floor surface with a material to the height of a channel side wall top edge, whereby liquid on the material may flow into the channel member through the channel inlet and along the inclined surface and out through the channel drain opening.

Preferably, the method further comprises the step of covering the inclined surface with an impermeable covering layer and the covering layer is preformed and is inserted into the channel over and covering the inclined surface. The method further comprises the step of locating an elongate grate over the channel opening. During said step of placing, a channel side wall top edge is placed adjacent a vertical wall, and wall tile are adhered on the vertical wall over the adjacent side wall top edge, whereby liquid on the vertical wall tile may also flow into the channel member. The sloping member may be preformed of a material selected from one or more of foam, plastic and fiberglass. The channel drain opening may extend through the channel bottom surface, and a pipe can be connected traversing through the floor surface to the channel drain opening. Alternatively, the channel drain opening extends in part through a channel side wall, and a pipe is connected traversing over the floor surface to the channel drain opening. Preferably, during said step of filling, the material is filled to at least the height of a channel side wall top edge.

A plurality of preformed elongate sloping members each having a thick end tapering to a thin end can be inserted into the channel on the bottom surface. A first one of the plurality of elongate sloping members includes a thin end having a thickness substantially equal to a thick end of second elongate sloping member, and wherein said ends having substantially equal thicknesses are placed adjacent one another, whereby the first and second sloping members form a continuous sloping inclined surface.

The elongate channel member may comprise one or more preformed channel sections selected from elongate straight channel sections, 90° corner sections, 45° corner sections, 30° corner sections and sections with a drain opening and wherein, during said step of placing, a plurality of channel sections are adhered to one another for thereby forming the elongate channel member.

Additionally, during said step of filling, a floor height setting post having a base adapted to sit on the floor surface and a post extending vertically upwardly therefrom to a terminal end is placed on the floor surface with the terminal end extending to a height higher than a channel side wall top edge, and wherein the fill material is plastically formable and is positioned forming an inclined floor surface sloping from the post terminal end toward the channel side wall top edge, the plastically formable material thereafter hardening into a solid material. The post terminal end includes stacked breakaway sections and, prior to said step of filling, a breakaway section is removed for thereby providing a post terminal end extending to a desired height.

Alternatively, during said step of filling, a preformed sloping sheet member having a thick end tapering to a thin end is placed on the level floor surface with the thin end adjacent the channel, wherein the preformed sheet member forms an inclined floor surface sloping toward the channel side wall top edge. The sloping sheet member is preformed of a material selected from one or more of foam, plastic and fiberglass. The trench drain can be installed in a shower room including a shower spray head adapted to spray water onto the fill material.

In another form thereof, the present invention is directed to a trench drain system for installation on a level floor surface comprising: an elongate channel member having a bottom surface, side walls extending upwardly therefrom to side walls top edges, a channel inlet between the side walls top edges and a drain opening, said elongate channel adapted to be placed on a level floor surface; and, a preformed elongate sloping member having a thick end tapering to a thin end adapted to be inserted into said channel on said bottom surface thereof with said thin end closest to said channel drain opening, said sloping member forming an inclined surface sloping toward said drain opening whereby, by filling an area adjacent said channel over the level floor surface with a material to a height of a channel side wall top edge, liquid on the adjacent fill material can flow into the channel member through the channel inlet and along said inclined surface and out through said channel drain opening.

Preferably, an impermeable covering layer is adapted to be placed over and covering the inclined surface; an elongate grate is adapted to be located over the channel opening; and, the sloping member is preformed of a material selected from one or more of foam, plastic, and fiberglass. The channel drain opening may extend through the channel bottom surface and be adapted for connecting a pipe thereto and/or the channel drain opening may extend in part through a channel side wall and be adapted for connecting a pipe thereto. Further, the elongate channel member may comprise one or more preformed channel sections selected from elongate straight channel sections, 90° corner sections, 45° corner sections, 30° corner sections and sections with a drain opening, said channel sections adapted to selectively be adhered to one another for thereby forming the elongate channel member. An impermeable covering layer may be provided and adapted to be placed over and covering the inclined surface. An elongate grate may be provided and adapted to be located over the channel opening. The sloping member is preferably preformed of a material selected from one or more of foam, plastic, and fiberglass.

In yet another form thereof, the present invention is directed to a method of installing a trench drain on a floor surface comprising the steps of: placing an elongate channel member on the floor surface, the channel member having a bottom surface, side walls extending upwardly therefrom to side walls top edges, a channel inlet between the side walls top edges and a drain opening; wherein, during said step of placing, a channel side wall top edge is placed adjacent a vertical wall; adhering wall tile on the vertical wall over the adjacent side wall top edge; and, filling an area adjacent the channel over the floor surface with a material to a height of a channel side wall top edge, whereby liquid on the fill material and on the vertical wall tile may flow into the channel member through the channel inlet and then out through the channel drain opening.

Preferably the method further comprises the step of locating an elongate grate over the channel opening. The channel drain opening may extend through the channel bottom surface, and the method further comprises the step of connecting a pipe traversing through the floor surface to the channel drain opening. The channel drain opening may extend in part through a channel side wall, and the method further comprises the step of connecting a pipe traversing over the floor surface to the channel drain opening. Preferably, the elongate channel member comprises one or more preformed channel sections selected from elongate straight channel sections, 90° corner sections, 45° corner sections, 30° corner sections and sections with a drain opening and wherein, during said step of placing, a plurality of channel sections are adhered to one another for thereby forming the elongate channel member.

During said step of filling, a floor height setting post having a base adapted to sit on the floor surface and a post extending vertically upwardly therefrom to a terminal end may be placed on the floor surface with the terminal end extending to a height higher than a channel side wall top edge, and the fill material is plastically formable and is positioned forming an inclined floor surface sloping from the post terminal end toward the channel side wall top edge, the plastically formable material thereafter hardening into a solid material. The post terminal end may include stacked breakaway sections and, prior to said step of filling, a breakaway section is removed for thereby providing a post terminal end extending to a desired height.

During said step of filling, a preformed sloping sheet member having a thick end tapering to a thin end may be placed on the level floor surface with the thin end adjacent the channel, whereby the preformed sheet member forms an inclined floor surface sloping toward the channel side wall top edge. The sloping sheet member is preferably preformed of a material selected from one or more of foam, plastic, and fiberglass. The trench drain may be installed in a shower room including a shower spray head adapted to spray water onto the fill material.

In yet another form thereof, the present invention is directed to method of installing a trench drain on a level floor surface comprising the steps of: placing an elongate channel member on the floor surface, the channel member having a bottom surface, side walls extending upwardly therefrom to side walls top edges, a channel inlet between the side walls top edges and a drain opening; and, filling an area adjacent the channel over the level floor surface with a preformed sloping sheet member having a thick end tapering to a thin end by placing the sheet member on the level floor surface with the thin end adjacent the channel and thereby forming an inclined floor surface sloping toward a channel side wall top edge, whereby liquid on the inclined floor surface may flow into the channel member through the channel inlet and then out through the channel drain opening.

In another form thereof, the invention is directed to a method of installing a trench drain on a floor surface comprising the steps of: placing an elongate channel member on the floor surface, the channel member having a bottom surface, side walls extending upwardly therefrom to side walls top edges, a channel inlet between the side walls top edges and a drain opening; filling an area adjacent the channel over the floor surface with a material to a height of a channel side wall top edge; and, wherein, during said step of filling, a floor height setting post having a base adapted to sit on the floor surface and a post extending vertically upwardly therefrom to a terminal end is placed on the floor surface with the terminal end extending to a height higher than the channel side wall top edge, and wherein the fill material is plastically formable and is positioned forming an inclined floor surface sloping from the post terminal end toward the channel side wall top edge, the plastically formable material thereafter hardening into a solid material, whereby liquid on the inclined floor surface may flow into the channel member through the channel inlet and then out through the channel drain opening.

BRIEF DESCRIPTION OF THE DRAWINGS

The above mentioned and other features of this invention, and the manner of attaining them, will become more apparent and the invention itself will be better understood by reference to the following description of the embodiments of the invention taken in conjunction with the accompanying drawings, wherein.

Figure 1:
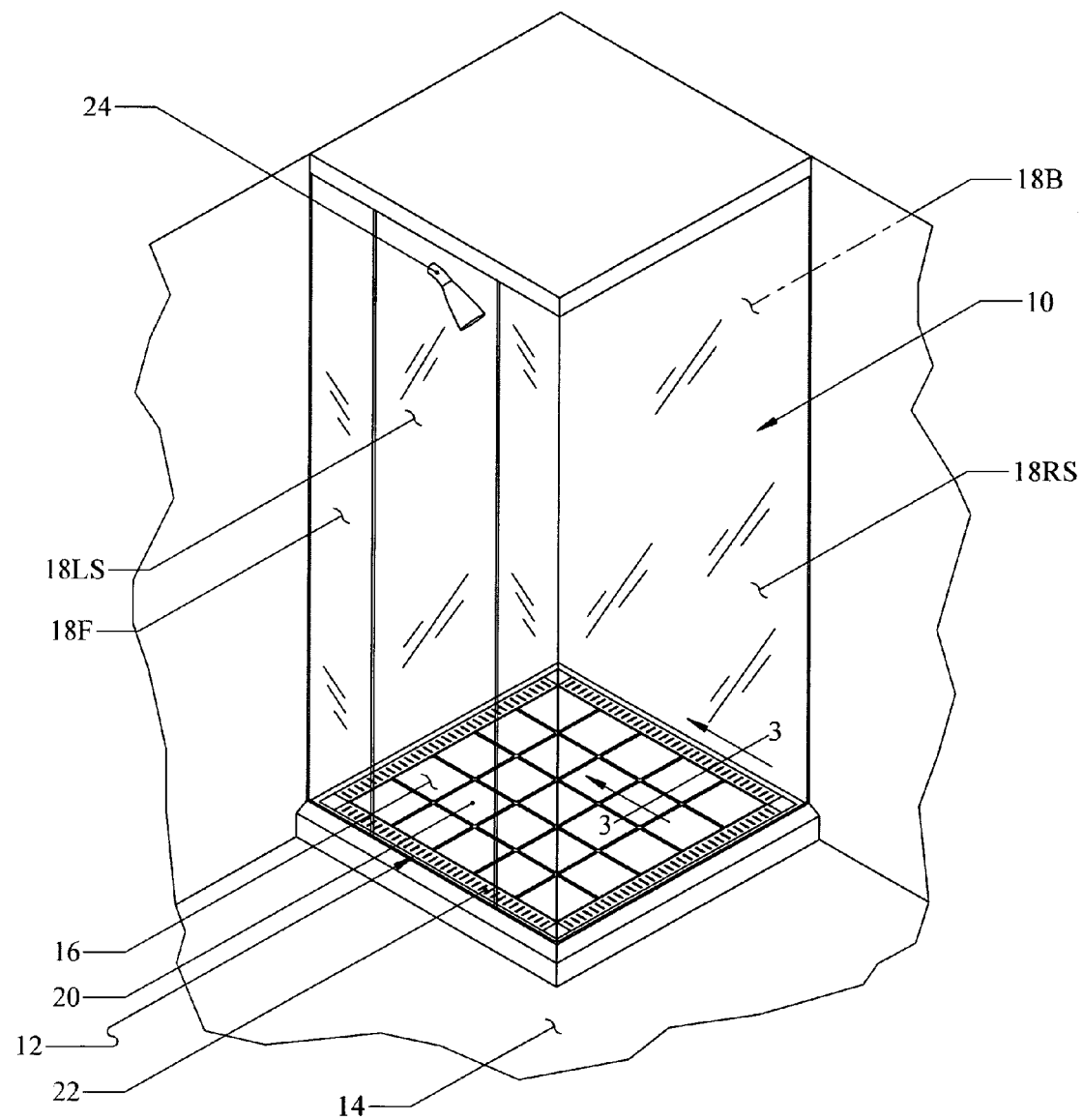
FIG. 1 is a perspective view of a shower room including a trench drain system constructed in accordance with the principles of the present invention and installed at the perimeter of the floor.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Referring initially to FIG. 1, a shower room generally depicted by the numeral 10 is shown wherein a trench drain system 12 has been installed on a level floor surface 14. The trench drain system 12 is installed along the perimeter of the raised shower inclined floor surface 16 adjacent the shower vertical walls 18S, 18LS, 18RS and 18B. Preferably, the inclined floor surface 16 is covered with floor tile 20 and/or other sufficiently slip resistant and visually appealing surface covering. The inclined floor surface 16 slopes toward the elongate grate 22 of the trench drain system 12 whereby water sprayed thereon from a shower spray head 24 flows to the grate 22 for drainage away therefrom. It is contemplated that the trench drain system 12 of the present invention can also be installed in floors of rooms and areas other than showers and also for drainage of liquids other than water so long as such liquids can flow along the inclined floor surface 16 to the grate 22 thereof.

The preferred method of installation and trench drain system 12 includes an elongate channel member 26 which is preferably constructed by securely adhering together one or more preformed channel sections 28 including but not limited to: elongate straight channel sections 28S; 90° corner channel sections 28C90; 45° corner channel sections 28C45 (not shown); 30° corner channel sections 28C30 (not shown); channel bottom drain sections 28DB; and, channel side wall drain sections 28DS. Each of the channel sections 28 are generally U-shaped having a bottom wall 30 defining a bottom surface 30S; side walls 32 extending vertically upwardly from the bottom wall 30; and, rim projections 34 extending horizontally from the top of the side walls 32 and defining side walls top edges 34E. An elongate channel inlet 36 is, hence, defined between the rim projections 34 or side wall top edges 34E into the channel member 26. The bottom wall 30 of each of the sections 28 is horizontally disposed and is thereby adapted to be placed on a generally flat level floor surface 14.

The channel bottom drain sections 28DB include a drain opening/outlet 38 extending through their bottom wall 30. Similarly, channel side wall drain sections 28DS include a drain opening/outlet 38 extending through their side wall 32. Drain openings 38 are adapted for connecting a pipe 40 thereto in a known and customary manner. It is noted that one or more of each of the drain sections 28DB and/or 28DS can be used in a trench drain 26 installation.

The terminal ends of each of the channel sections 28 are provided with one of a female attachment groove 42 and/or a male attachment extension 44. Grooves 42 are adapted to slidingly receive the extensions 44 for attachment of the channel sections 28 to one another. Additionally, coupling members 46 may be used for joining shorter lengths to one another, and end cap members 48 may be used at terminal ends of an elongate channel 26 as, for example, shown in FIG. 9. Preferably, each of the channel sections 28, coupling members 46, end cap members 48 and pipe 40 are made of PVC plastic and are hermetically secured and sealed to one another with a PVC adhesive. As should now be appreciated, the several channel sections 28 are selectively attachable and secured to one another for forming any desired elongate shape channel member 26.

Trench drain system 12 includes a preformed elongate sloping member 50 adapted to be received in the channel member 26, through the inlet opening 36, and located on the bottom wall surface 30S for thereby forming an inclined surface 50I sloping toward the drain opening 38. The elongate sloping member 50 includes a terminal thick end 50K tapering down to a terminal thin end 50N, a bearing surface 50B, a top inclined surface 50I and side walls 50S. When inserted into the channel member 26, the bearing surface 50B sits or bears on the channel bottom wall surface 30S and the side walls 50S are located adjacent the channel side walls 32. Preferably, the preformed elongate sloping member 50 is made of a material selected from one or more of foam, plastic, and fiberglass.

Figure 2A:
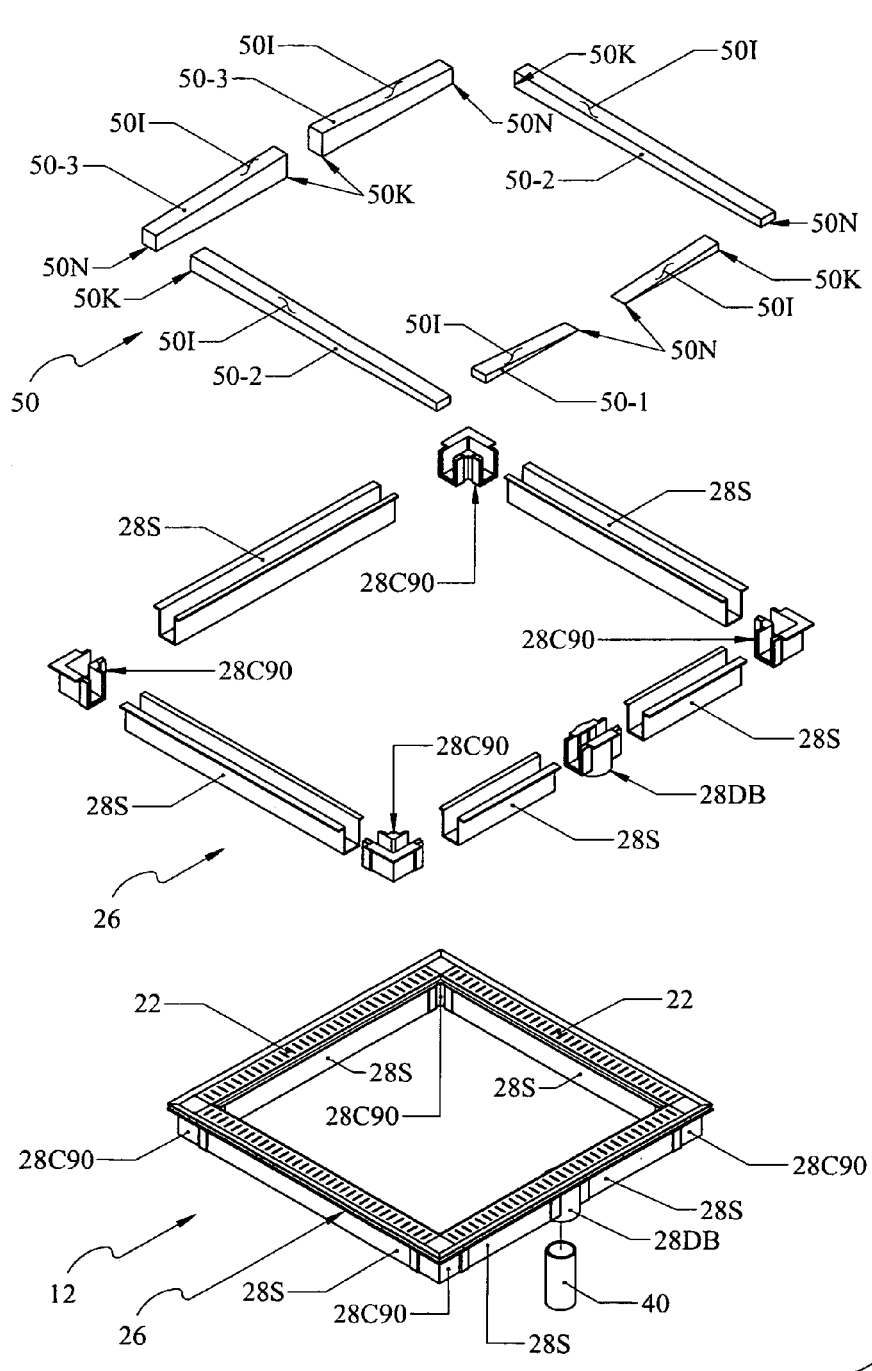
FIG. 2 is a is an exploded perspective view of the trench drain system shown in FIG. 1.
Figure 5:
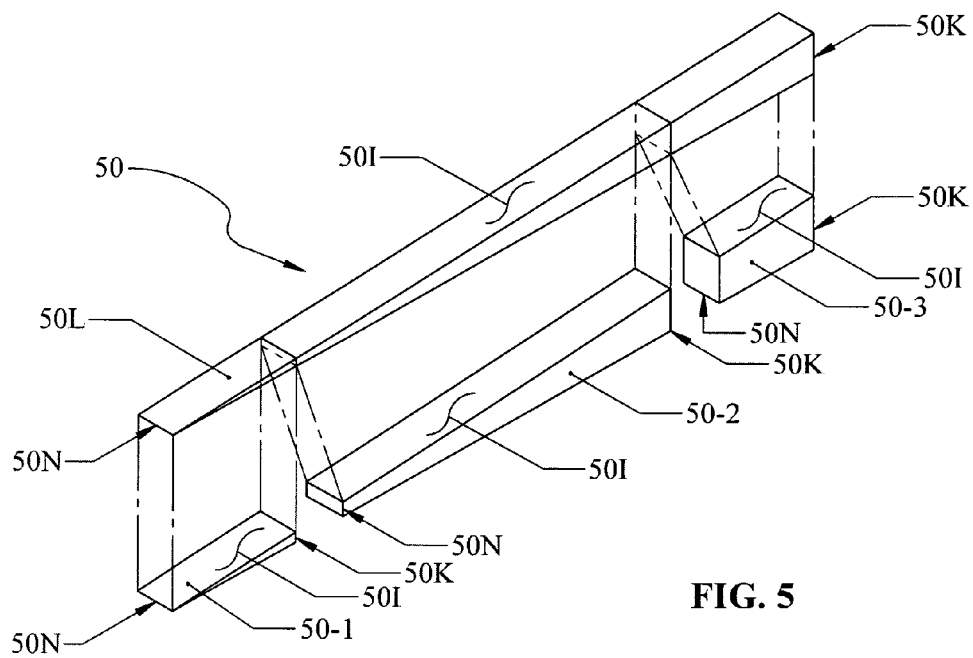
FIG. 5 is a perspective exploded view of a preformed elongate sloping member of the trench drain system constructed and severed into smaller sections in accordance with the principles of the present invention.

As best seen in FIG. 5, sloping member 50 can be provided in stock long lengths 50L and severed for making any desired shorter length sloping member 50. In FIG. 5, the stock long length 50L is shown being severed into shorter length sloping members 50-1, 50-2 and 50-3. As best shown in FIG. 2, each of the shorter length sloping members can be inserted into the elongate channel member 26, end to end with each thick end 50K adjacent a thin end 50N, for thereby providing a continuous inclined surface 50I along the entire length of the channel member 26 and through the corner channel sections 28C90, 28C45 and 28C30.

Figure 4:
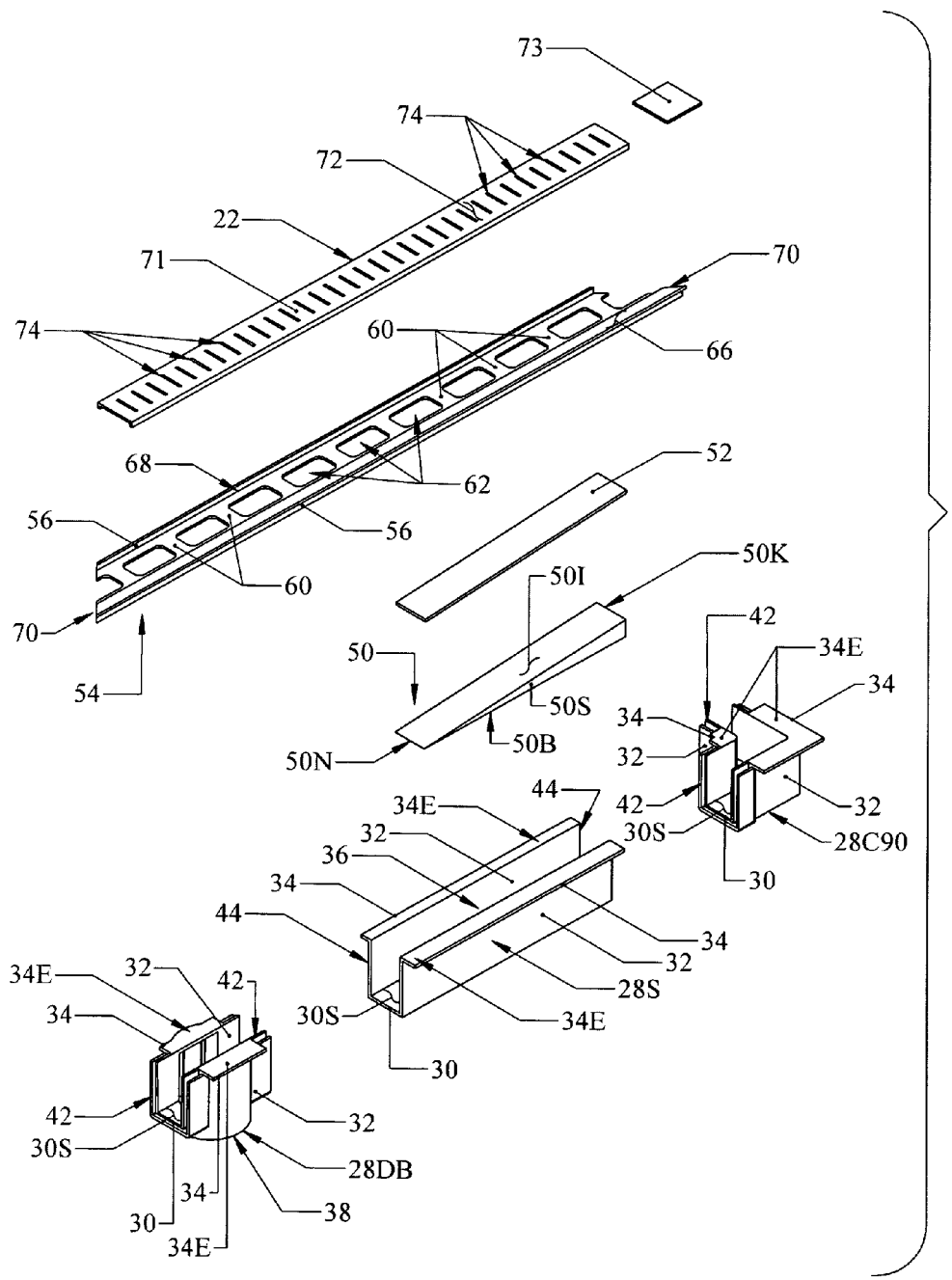
FIG. 4 is a partial exploded perspective view of the trench drain system shown in FIG. 1, similar to FIG. 2 but depicting several of the trench drain components in greater detail.
Figure 9:
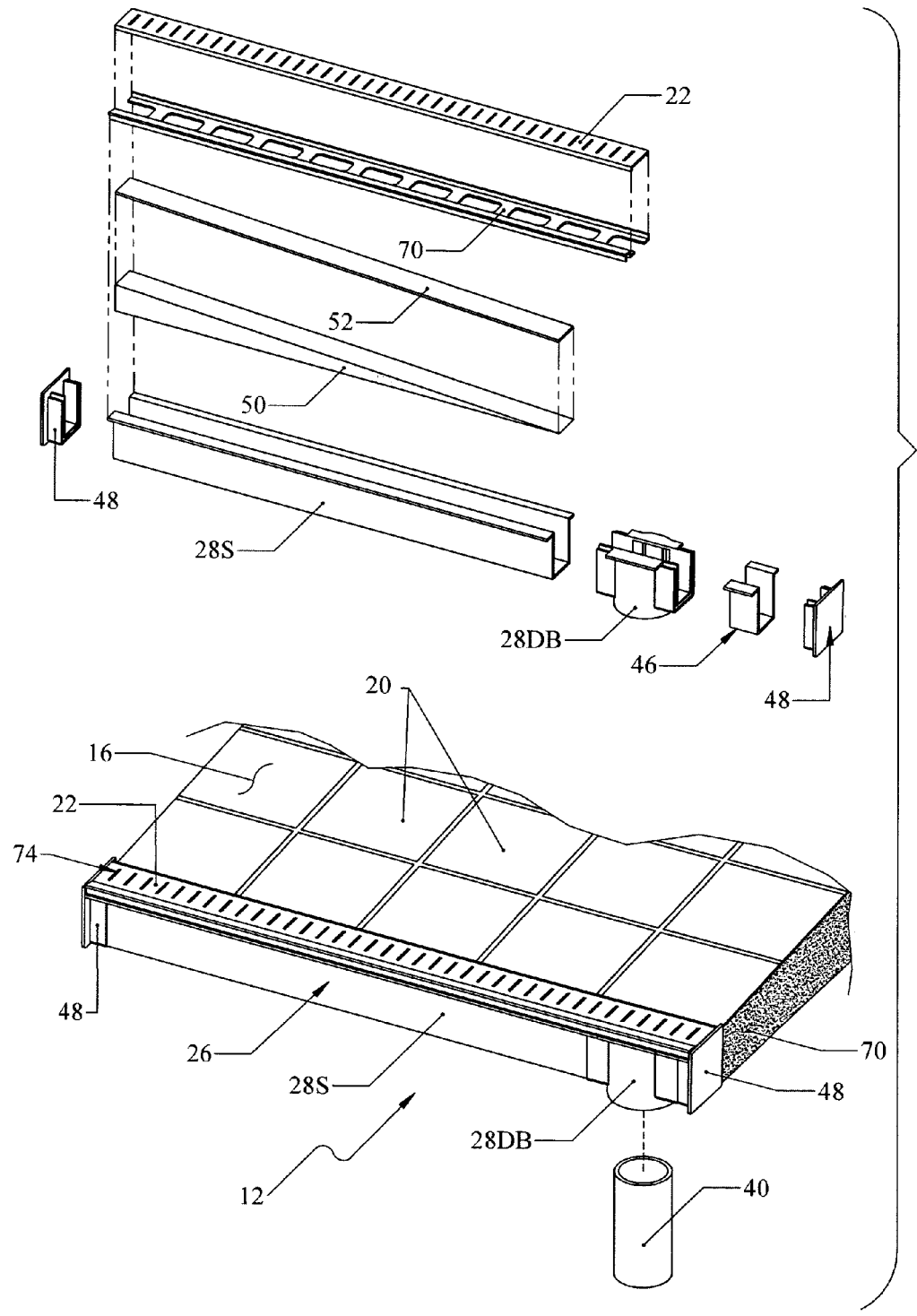
FIG. 9 is an exploded perspective view of a trench drain system constructed in accordance with the principles of the present invention adjacent an inclined floor surface.

As shown in FIGS. 4 and 9, the thin terminal end 50N is placed closest to the channel drain opening 38. Similarly, as shown in FIG. 2, the thinnest terminal end 50N of the short length member 50-1 is placed closest to the channel drain opening 38. Accordingly, the elongate sloping member 50 forms a continuous inclined surface 50I sloping toward the drain opening 38 so that water or other liquids that flow into the channel member 26 may flow along the inclined surface 50I and out through the channel drain opening 38.

Preferably, the preformed elongate sloping member 50 is sealed and/or covered with a preformed impermeable elongate covering layer 52. Covering layer 52 is preferably a thin strip of PVC plastic or other water impermeable material which can be cut to a length and width corresponding to the sloping member inclined surface 501. As shown in FIG. 2, a longer length covering layer 52 has been cut to shorter length covering layer sections 52-1, 52-2 and 52-3 corresponding to and adapted to be inserted into the channel 26 over and covering inclined surfaces 501 of the respective short length sloping members 50-1, 50-2 and 50-3. The covering layer 52 is secured in place between the channel side walls 32 and over the elongate sloping member 50 with an adhesive and/or other bonding agents. Alternatively, a bonding or other plastically formable material can be poured or painted onto the sloping member inclined surface 501 for thereby forming an impermeable covering layer thereover and between the channel walls 32.

An elongate grate supporting member 54 is provided and adapted to set on and be secured on the rim projections 34 at the side walls top edges 34E. Supporting member 54 includes an outer rail 56, an inner rail 58, and ribs 60 extending therebetween for thereby forming large inlet openings 62. An elongate grate receiving channel 68 is formed and provided over the ribs 60 and inlet openings 62 and between the outer and inner rails 56, 58. The elongate grate 22 is adapted to fit into the grate receiving channel 68. Supporting member 54 is preferably made of PVC plastic and/or other water resistant materials.

Figure 3:
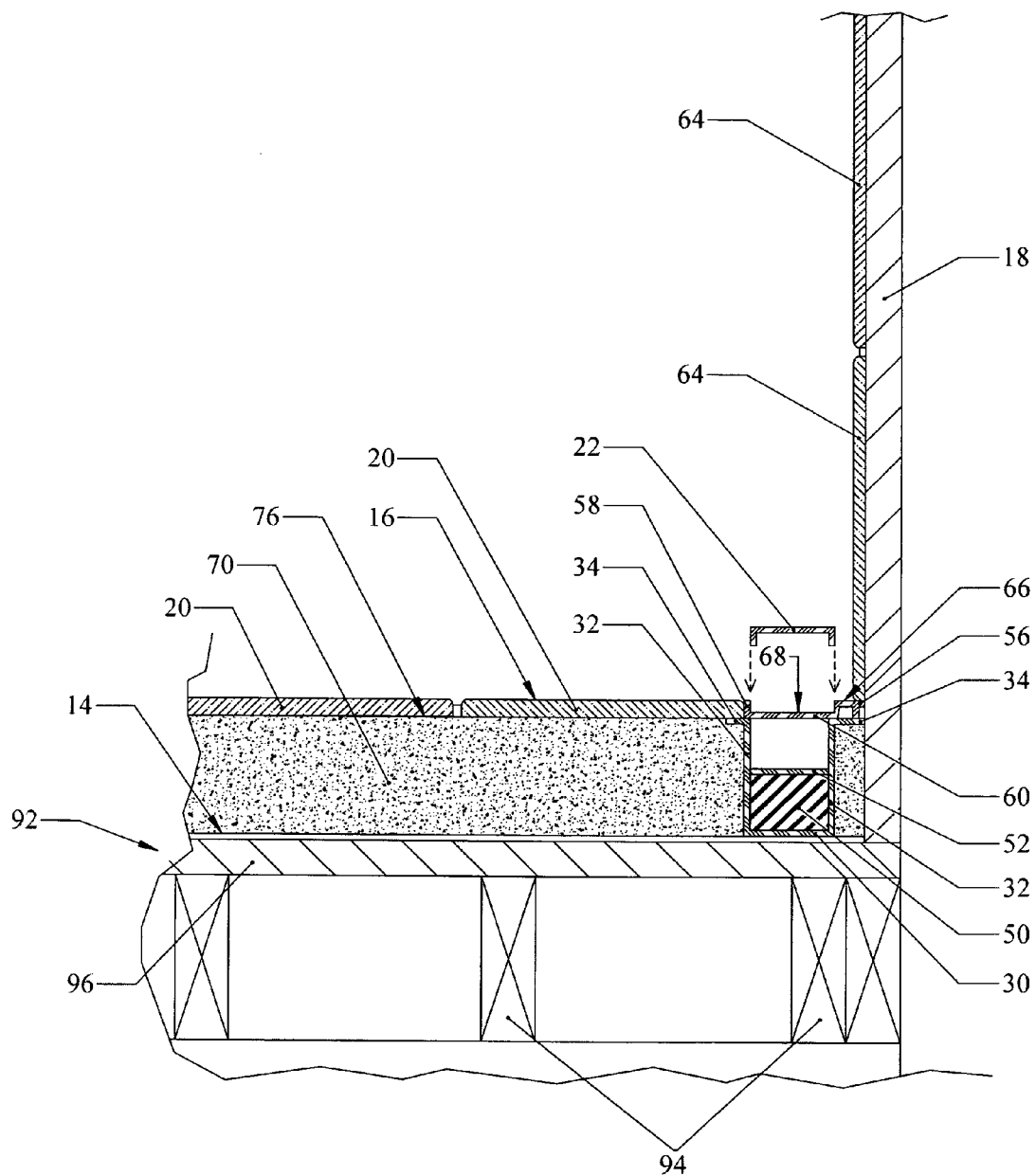
FIG. 3 is a cross sectional view of the trench drain system shown in FIG. 1 taken along line 3-3.

As best seen in FIG. 3, the trench drain system 12 can be located adjacent a vertical wall 18, with the outer rail 56 of the grate supporting member 54 being located adjacent the vertical wall 18. Advantageously, vertical wall tile 64 can bear upon and be supported by the outer rail 56 when the wall tiles 64 are being adhered to the vertical wall 18. As also best seen in FIG. 3, outer rail 56 is sufficiently wide and includes a finish surface 66 so that the outer rail 56 can be placed abutting the vertical wall 18 and accommodate the thickness of the wall tile 64. That is, after the wall tile 64 has been secured to the vertical wall 18, the tile thickness does not interfere with and the finish surface 66 remains visible. More importantly, the grate receiving channel 68 is thereby located a short distance from the wall tile 64 so that the tile does not interfere with and so that the grate 22 can readily and easily be place in and removed from the channel 68.

The inner rail advantageously forms a lip for abutment of the floor tile 20. That is, after the area over the floor 14 and adjacent the channel member 26 is filled with a fill material 70 to the height of the side walls top edge 34E, inner rail 58 provides an abutting edge for the floor tile 20. This also locates the finish floor surface 16 as high as the grate 22 so that water thereon may flow from the finish floor surface 16 over and onto the grate 22.

As best seen in FIGS. 2 and 4, the grate supporting members 54 are miter cut at their terminal ends as indicated by the numeral 70 for accommodating and fitting over the corner channel sections 28C90, 28C45 and 28C30. As mentioned herein above, elongate grate 22 fits snugly in the channel 68 of the elongate grate supporting member 54. Grate 22 is similarly preferably made of PVC plastic and/or other water resistant materials. Grate 22 includes an elongate flat body 71 having a finish surface 72 and a plurality of inlet openings 74. For accommodating and fitting over the corner sections 28C90, corner caps 73 are provided and secured at the terminal ends of the individual grate sections 22 by inserting into the channel 68 at the mitered corners 70 of the grate supporting member 54.

Accordingly, with the grate 22 located in the grate supporting member channel 68, water and/or other liquids can flow from a floor surface 16 and from the vertical wall tile 64 onto the grate 22 and through the grate inlet openings 74, through the large inlet openings 62 of the grate supporting member 54, through the elongate channel inlet 36 into the channel member 26, along the inclined surface 501 and then out through the channel drain opening/outlet 38.

As mentioned herein above, after the elongate channel member 26 is placed on the floor surface 14, the area adjacent the channel member 26 over the level floor surface 14 is filled with a fill material 70 to the height of the side walls top edge 34E so that water and/or other liquids on the surface 76 of the fill material and/or the finish floor surface 16 may flow into the channel member 26. The fill material surface 76 is inclined having a slope toward the side walls top edge 34E and so, after installation of the floor tile 20 thereon, the tile floor surface 16 is similarly inclined having a slope toward the side walls top edge 34E.

Fill material 70 can be preformed and/or a plastically formable hard setting material. When using a plastically formable fill material such as concrete, preferably, a floor height setting post 78 is used for setting a desired height, higher than the side walls top edge 34E, and positioning the fill material and forming the inclined floor surface 76. Floor height setting post 78 includes a base 80 adapted to sit on the level floor surface 14 and a post 82 extending perpendicular and vertically upwardly from the base 80. Post 82 extends vertically upwardly to a terminal end 82 and includes stacked breakaway sections 86 separated by weakened areas 88. By severing at the weakened areas 88 and removing one or more breakaway sections 86, the height of the post terminal end 84 can be modified so as to extend to a desired height from the level floor 14 for thereby creating a reference plane (between the post terminal end 84 and the side wall top edge 34E) and for positioning the plastically formable fill material floor surface 76 at an incline sloping from the post terminal end 84 toward the channel side wall top edge 34E. After positioning, the plastically formable fill material is allowed to harden for thereby providing an inclined hard floor surface 76.

Figure 6:
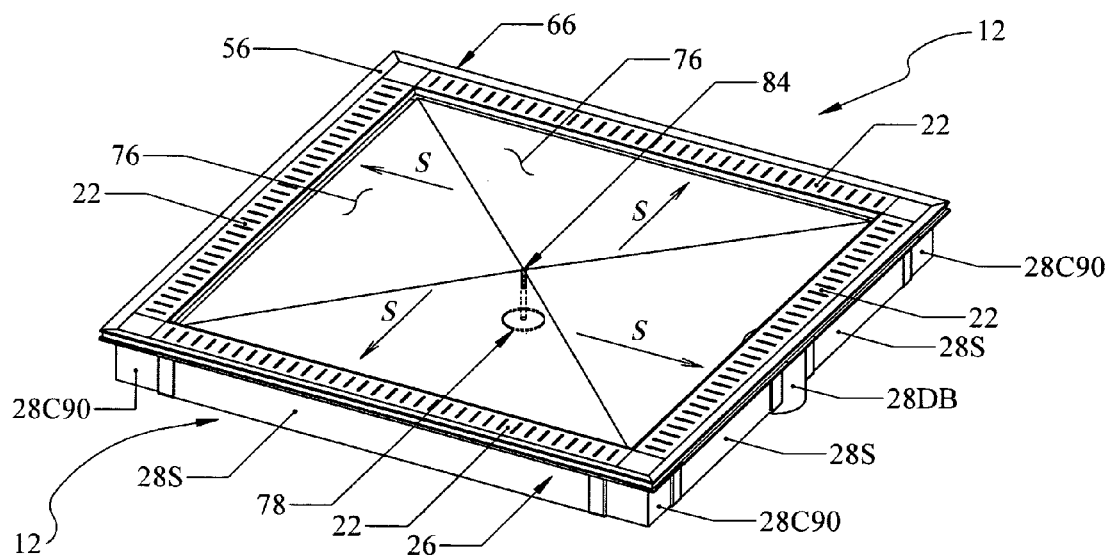
FIG. 6 is a perspective view depicting a floor adjacent a trench drain system which has been installed using a floor height setting post in accordance with the principles of the present invention.
Figure 7:
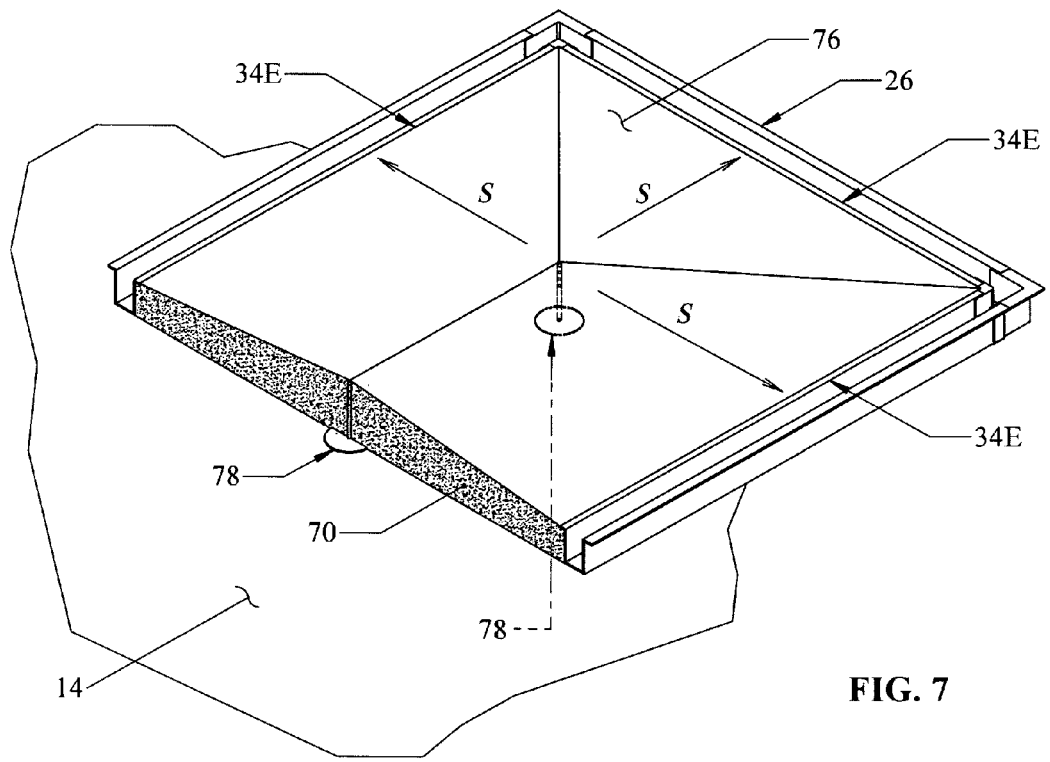
FIG. 7 is perspective view of another floor adjacent a trench drain system which has been installed using a plurality of floor height setting posts in accordance with the principles of the present invention.
Figure 8:
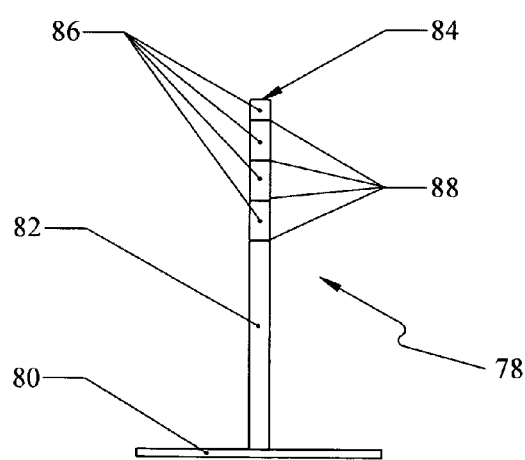
FIG. 8 is a side elevation view of a floor height setting post shown in FIGS. 6 and 7.

As shown in FIG. 6, a floor height setting post 78 can be used generally in the middle of a trench drain system 12 whereby the fill material floor surface 76 can be sloped, as indicated by arrows S, toward the elongate channel member side wall top edge 34E and/or grate 22 which extend around the entire perimeter. As shown and depicted in FIG. 7, several floor height setting posts 78 can be used when the perimeter/trench drain system 12 is not symmetrical whereby, again, the floor surface 76 can be sloped as indicated by arrows S toward the channel side wall top edges 34E.

Figure 11:
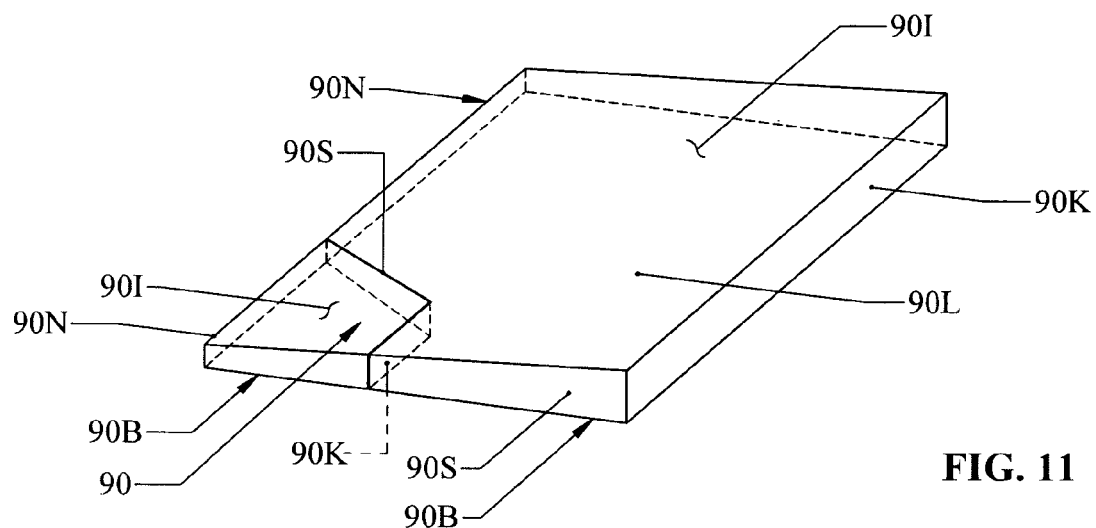
FIG. 11 is a perspective view of a stock preformed sloping sheet member of the trench drain system depicting the severing thereof into smaller preformed sheet sections in accordance with the principles of the present invention.
Figure 10:
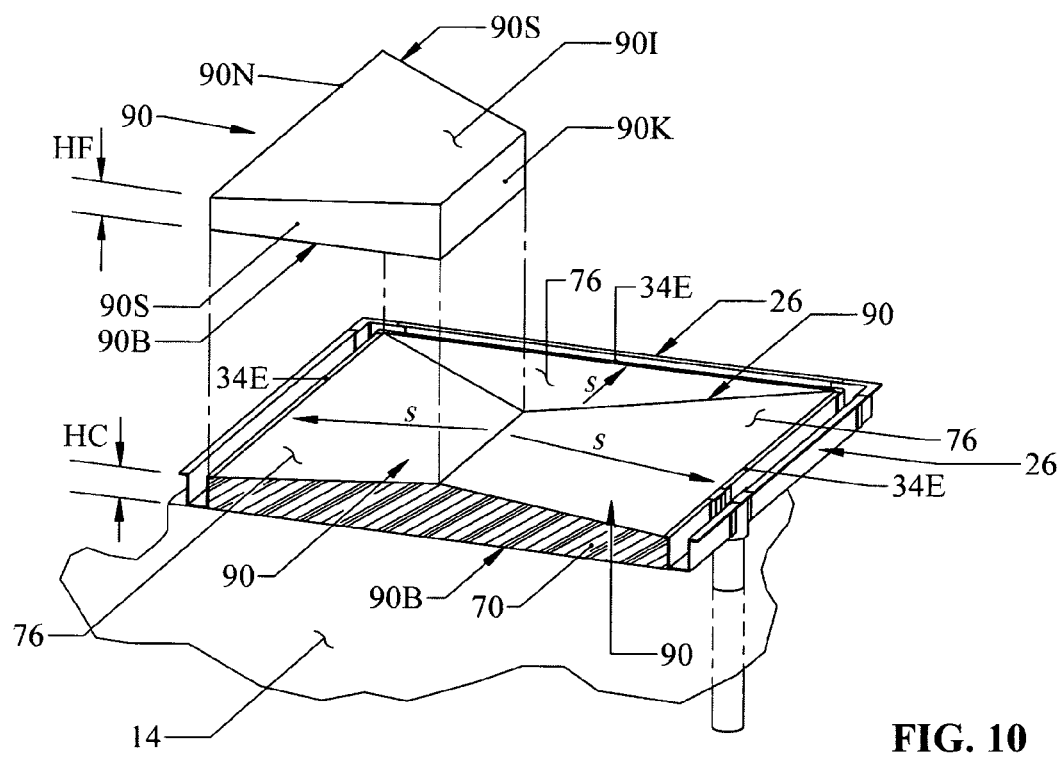
FIG. 10 is a perspective view depicting a floor adjacent a trench drain system which has been installed using preformed sloping sheet members in accordance with the principles of the present invention.
Figure 12:
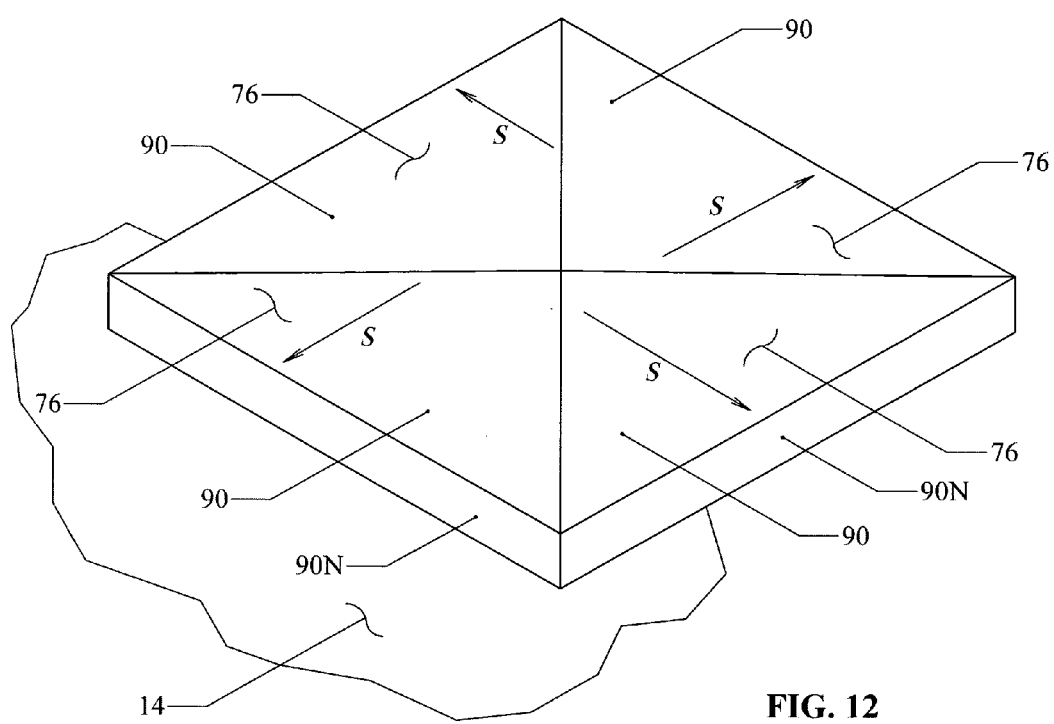
FIG. 12 is a perspective view of inclined floor surface constructed in accordance with the principles of the present invention.
Figure 13:
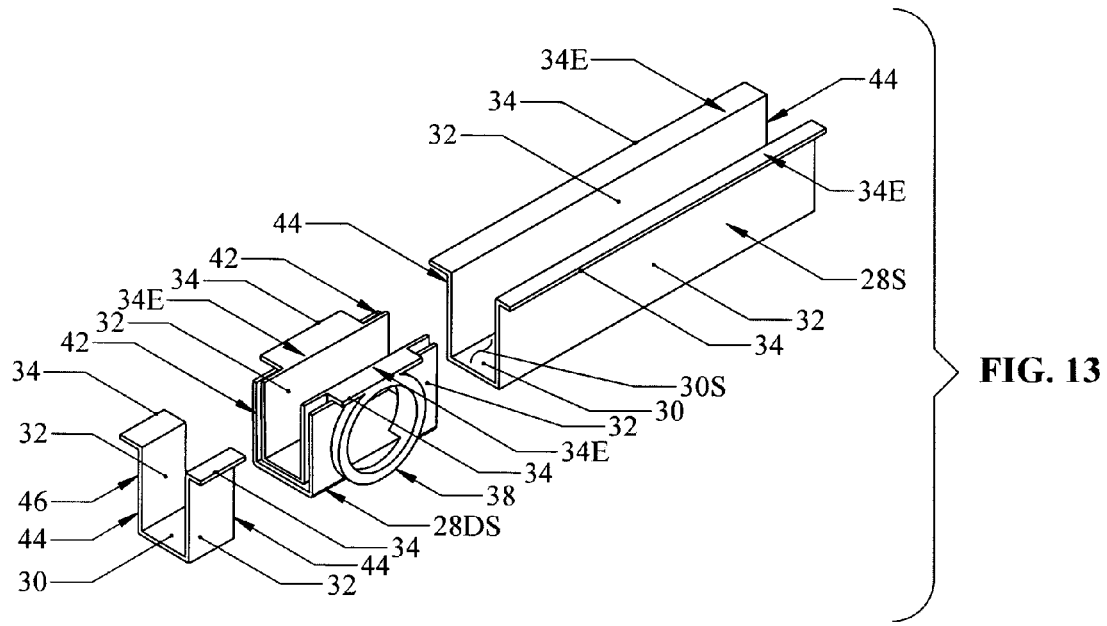
FIG. 13 is an exploded view of several components of the trench drain system and depicting a drain opening extending through a channel side wall.

As shown in FIGS. 10, 11 and 12, fill material 70 can be a preformed sloping sheet member 90 adapted to be placed on the level floor surface 14 and form the inclined floor surface 76. The sloping sheet member 90 includes a thick end 90K tapering down to a thin end 90N, a bearing bottom surface 90B, side walls 90S, and a sloping sheet member top inclined surface 901. As shown in FIG. 11, sloping sheet member 90 can be cut from larger preformed sloping stock sheets 90L.

In use, sloping sheet member 90 is placed on the level floor surface 14 with its bottom surface 90B bearing upon the floor surface 14 and its thin end 90N adjacent the elongate channel member 26. The height of the channel member 26 indicated by arrows HC (from the channel bottom wall 30 or floor 14 to the side walls top edges 34E) and the thickness of the sloping sheet member 90 at its thin end 90N indicated by arrows HF are substantially equal, and so the sheet member inclined surface 901 forms the fill material inclined floor surface 76. As should now be appreciated, one or more preformed sloping sheet members 90 can be used as shown in FIGS. 10 and 12 for thereby filling the area adjacent the channel member 26 and over the level floor surface 14 and forming the inclined floor surface 76 sloping as indicated by arrows S toward the channel side wall top edges 34E.

Preferably, the preformed sloping sheet member 90 is made of a material selected from one or more of foam, plastic, and fiberglass such that the overall weight of the fill material 70 forming the inclined floor surface 76 is relatively small. This is particularly useful when the trench drain system 26 is installed on a structural floor 92 as, for example, depicted in FIG. 3. Structural floor 92 can, as shown, be constructed with a plurality of wood joists 94 and a subfloor layer 96 thereover, and for this and/or other reasons it may not be feasible to install a concrete raised floor thereon. In these installations, the preformed sloping sheet member 90 is particularly useful.

Figure 14:
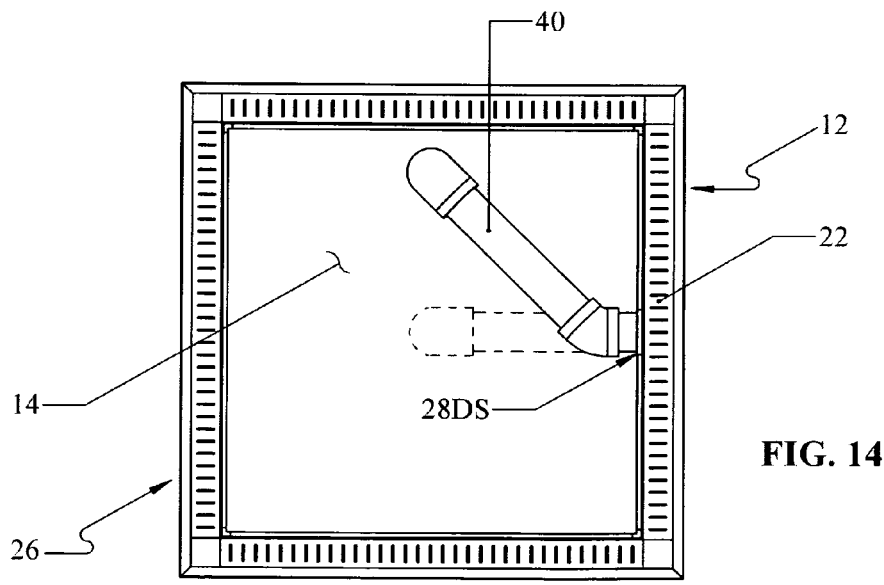
FIG. 14 is a top plan view of a trench drain system constructed in accordance with the principles of the present invention and showing a drain pipe connected thereto and traversing over a level floor surface; and, FIG. 15 is a side elevation view of the trench drain system shown in FIG. 14.
Figure 15:
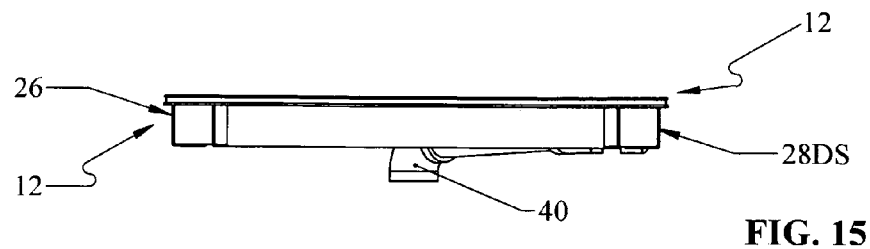

Referring now more particularly to FIGS. 14 and 15, a trench drain system 12 is illustrated wherein a channel side wall drain section 28DS is incorporated and a pipe 40 is connected to its opening/outlet 38. As shown, pipe 40 can traverse over the floor surface 14 to a desired location for connecting to an existing floor drain (not shown). A pipe 40 is shown in dash lines depicting an alternate floor drain whereto the drain opening 38 may be connected by traversing over the floor surface 14. Alternatively, as shown in FIG. 10, when pipe 40 is connected to a channel bottom drain section 28DB, pipe 40 traverses/extends through the floor surface 14.

While the invention has been described as having an exemplary design, the present invention may be further modified within the spirit and scope of this disclosure. This application is therefore intended to cover any variations, uses, or adaptations of the invention using its general principles.

What is claimed is:

1. A method of installing a trench drain on a level floor surface comprising the steps of:
    placing an elongate channel member on the floor surface, the channel member having a bottom surface, side walls extending upwardly therefrom to side walls top edges, a channel inlet between the side walls top edges and a drain opening;
    inserting a preformed wedge-shaped elongate sloping member having a thick end tapering to a thin end into the channel on the bottom surface with the thin end closest to the channel drain opening, the sloping member forming an inclined surface sloping toward the drain opening; and
    filling an area adjacent the channel over the floor surface with a material, whereby liquid on the material may flow into the channel member through the channel inlet and along the inclined surface and out through the channel drain opening.

2. The method of claim 1 further comprising the step of covering the inclined surface with an impermeable covering layer.

3. The method of claim 2 wherein the covering layer is preformed and is inserted into the channel over and covering the inclined surface.

4. The method of claim 1 further comprising the step of locating an elongate grate over the channel opening.

5. The method of claim 1 wherein, during said step of placing, a channel side wall top edge is placed adjacent a vertical wall, and further comprising the step of adhering wall tile on the vertical wall over the adjacent side wall top edge, whereby liquid on the vertical wall tile may also flow into the channel member.

6. The method of claim 1 wherein the sloping member is preformed of a material selected from one or more of foam, plastic and fiberglass.

7. The method of claim 1 wherein the channel drain opening extends through the channel bottom surface, and further comprising the step of connecting a pipe traversing through the floor surface to the channel drain opening.

8. The method of claim 1 wherein the channel drain opening extends in part through a channel side wall, and further comprising the step of connecting a pipe traversing over the floor surface to the channel drain opening.

9. The method of claim 1 wherein the elongate channel member comprises one or more preformed channel sections selected from elongate straight channel sections, 90° corner sections, 45° corner sections, 30° corner sections and sections with a drain opening and wherein, during said step of placing, a plurality of channel sections are adhered to one another for thereby forming the elongate channel member.

10. The method of claim 1 wherein, during said step of filling, a floor height setting post having a base adapted to sit on the floor surface and a post extending vertically upwardly therefrom to a terminal end is placed on the floor surface with the terminal end extending to a height higher than a channel side wall top edge, and wherein the fill material is plastically formable and is positioned forming an inclined floor surface sloping from the post terminal end toward the channel side wall top edge, the plastically formable material thereafter hardening into a solid material.

11. The method of claim 10 wherein the post terminal end includes stacked breakaway sections and, prior to said step of filling, a breakaway section is removed for thereby providing a post terminal end extending to a desired height.

12. The method of claim 1 wherein, during said step of filling, a preformed sloping sheet member having a thick end tapering to a thin end is placed on the level floor surface with the thin end adjacent the channel, wherein the preformed sheet member forms an inclined floor surface sloping toward the channel side wall top edge.

13. The method of claim 12 wherein the sloping sheet member is preformed of a material selected from one or more of foam, plastic and fiberglass.

14. The method of claim 1 wherein the trench drain is installed in a shower room including a shower spray head adapted to spray water onto the fill material.

15. The method of claim 1 further comprising the steps of
    covering the inclined surface with an impermeable covering layer;
    locating an elongate grate over the channel opening;
    wherein the elongate channel member comprises one or more preformed channel sections selected from elongate straight channel sections, 90° corner sections, 45° corner sections, 30° corner sections and sections with a drain opening and wherein, during said step of placing, a plurality of channel sections are adhered to one another for thereby forming the elongate channel member; and
    wherein the trench drain is installed in a shower room including a shower spray head adapted to spray water onto the fill material.

16. The method of claim 15 wherein, during said step of placing, a channel side wall top edge is placed adjacent a vertical wall, and further comprising the step of adhering wall tile on the vertical wall over the adjacent side wall top edge, whereby liquid on the vertical wall tile may also flow into the channel member.

17. The method of claim 15 wherein, during said step of filling, a floor height setting post having a base adapted to sit on the floor surface and a post extending vertically upwardly therefrom to a terminal end is placed on the floor surface with the terminal end extending to a height higher than a channel side wall top edge, and wherein the fill material is plastically formable and is positioned forming an inclined floor surface sloping from the post terminal end toward the channel side wall top edge, the plastically formable material thereafter hardening into a solid material.

18. The method of claim 15, wherein during said step of filling, a preformed sloping sheet member having a thick end tapering to a thin end is placed on the level floor surface with the thin end adjacent the channel, wherein the preformed sheet member forms an inclined floor surface sloping toward the channel side wall top edge.

19. The method of claim 18 wherein the elongate sloping member and the sheet member are each preformed of a material selected from one or more of foam, plastic and fiberglass.

20. The method of claim 1 wherein, during said step of filling, the material is filled to at least the height of a channel side wall top edge.

21. The method of claim 1 wherein a plurality of preformed elongate sloping members each having a thick end tapering to a thin end are inserted into the channel on the bottom surface.

22. The method of claim 21 wherein a first one of the elongate sloping members includes a thin end having a thickness substantially equal to a thick end of second elongate sloping member, and wherein said ends having substantially equal thicknesses are placed adjacent one another, whereby the first and second sloping members form a continuous sloping inclined surface.

23. A trench drain system for installation on a level floor surface comprising:
an elongate channel member having a bottom surface, side walls extending upwardly therefrom to side walls top edges, a channel inlet between the side walls top edges and a drain opening, said elongate channel adapted to be placed on a level floor surface; and,
a preformed elongate wedge-shaped sloping member having a thick end tapering to a thin end adapted to be inserted into said channel on said bottom surface thereof with said thin end closest to said channel drain opening, said sloping member forming an inclined surface sloping toward said drain opening whereby, by filling an area adjacent said channel over the level floor surface with a material to a height of a channel side wall top edge, liquid on the adjacent fill material can flow into the channel member through the channel inlet and along said inclined surface and out through said channel drain opening.

24. The trench drain system of claim 23 further comprising an impermeable covering layer adapted to be placed over and covering the inclined surface.

25. The trench drain system of claim 23 further comprising an elongate grate adapted to be located over the channel opening.

26. The trench drain system of claim 23 wherein said sloping member is preformed of a material selected from one or more of foam, plastic, and fiberglass.

27. The trench drain system of claim 23 wherein said channel drain opening extends through the channel bottom surface and is adapted for connecting a pipe thereto.

28. The trench drain system of claim 23 wherein said channel drain opening extends in part through a channel side wall and is adapted for connecting a pipe thereto.

29. The trench drain system of claim 23 wherein said elongate channel member comprises one or more preformed channel sections selected from elongate straight channel sections, 90° corner sections, 45° corner sections, 30° corner sections and sections with a drain opening, said channel sections adapted to selectively be adhered to one another for thereby forming the elongate channel member.

30. The trench drain system of claim 29 further comprising an impermeable covering layer adapted to be placed over and covering the inclined surface and an elongate grate adapted to be located over the channel opening.

31. The trench drain system of claim 23 further comprising an impermeable covering layer adapted to be placed over and covering the inclined surface and an elongate grate adapted to be located over the channel opening.

32. The trench drain system of claim 31 wherein said sloping member is preformed of a material selected from one or more of foam, plastic, and fiberglass.

33. The trench drain system of claim 23 comprising a second preformed elongate sloping member having a thick end tapering to a thin end adapted to be inserted into said channel on said bottom surface thereof with said thin end closest to said channel drain opening, said second preformed sloping member also forming an inclined surface sloping toward said drain opening, whereby liquid on the adjacent fill material can flow into the channel member through the channel inlet and along said inclined surfaces of both preformed elongate sloping members and out through said channel drain opening.

34. The trench drain system of claim 23 comprising a second preformed elongate sloping member having a thick end tapering to a thin end adapted to be inserted into said channel on said bottom surface thereof, wherein said thick end of said first one of said elongate sloping members has a thickness substantially equal to said thin end of said second elongate sloping member, whereby said ends having substantially equal thicknesses may be placed adjacent one another and the first and second sloping members form a continuous sloping inclined surface.

35. The trench drain system of claim 34 further comprising an elongate grate adapted to be located over the channel opening.

36. The trench drain system of claim 34 further comprising an impermeable covering layer adapted to be placed over and covering the inclined surfaces of said first and second preformed elongate sloping members.

37. The trench drain system of claim 23 wherein at least one of said side walls top edges comprises a tile abutting edge for supporting tile.

38. The trench drain system of claim 23 further comprising an elongate grate supporting member having a plurality of large inlet openings adapted to be located over the channel opening and an elongate grate adapted to be located over said grate supporting member.

39. The trench drain system of claim 38 wherein said elongate grate supporting member includes a rail for supporting wall tile.

40. The trench drain system of claim 38 wherein said elongate channel member comprises one or more preformed channel sections selected from elongate straight channel sections, 90° corner sections, 45° corner sections, 30° corner sections and sections with a drain opening, said channel sections adapted to selectively be adhered to one another for thereby forming the elongate channel member.

41. The trench drain system of claim 38 comprising a second preformed elongate sloping member having a thick end tapering to a thin end adapted to be inserted into said channel on said bottom surface thereof with said thin end closest to said channel drain opening, said second preformed sloping member also forming an inclined surface sloping toward said drain opening, whereby liquid on the adjacent fill material can flow through said grate and said supporting member into the channel member through the channel inlet and along said inclined surfaces of both preformed elongate sloping members and out through said channel drain opening.

42. The trench drain system of claim 38 comprising a second preformed elongate sloping member having a thick end tapering to a thin end adapted to be inserted into said channel on said bottom surface thereof, wherein said thick end of said first one of said elongate sloping members has a thickness substantially equal to said thin end of said second elongate sloping member, whereby said ends having substantially equal thicknesses may be placed adjacent one another and the first and second sloping members form a continuous sloping inclined surface.

43. A drainage system for receiving water from a floor, said drainage system comprising:
  grated tracks having a plurality of openings;
  an underneath channel running below said grated tracks;
  a drain located on said underneath channel;
  a wedge-shaped elongate sloping member having a thick end tapering to a thin end placed in and configured to the shape of said underneath channel with said thin end closest to said drain, wherein said sloping member achieves a slope creating drainage flow to said drain.

44. The drainage system of claim 43 wherein said grated tracks and underneath channel are located along a periphery of a shower floor.

45. The drainage system of claim 43 further comprising a drain conduit running from said drain to a floor drain.

46. The drainage system of claim 43 further comprising a waterproof membrane placed along the floor and extending over said underneath channel.

47. The drainage system of claim 44 further comprising a drain conduit running from said drain to a floor drain.

48. The drainage system of claim 47 further comprising a waterproof membrane placed along the floor and extending over said underneath channel.

49. The drainage system of claim 43 wherein said underneath channel is made of polyvinyl chloride.

50. The drainage system of claim 43 wherein said grated tracks are made of plastic.

51. The drainage system of claim 43 wherein a preformed tray is provide below the floor, and wherein a waterproof membrane is located between the floor and said tray and extends over said underneath channel.

52. The drainage system of claim 43 wherein said grated tracks are removable.

* * * * *

UNITED STATES PATENT AND TRADEMARK OFFICE
CERTIFICATE OF CORRECTION

| | |
|---|---|
| PATENT NO. | : 8,505,131 B2 |
| APPLICATION NO. | : 13/374791 |
| DATED | : August 13, 2013 |
| INVENTOR(S) | : Mark Doolittle et al. |

It is certified that error appears in the above-identified patent and that said Letters Patent is hereby corrected as shown below:

Title Page, Item (54), and in the specification, Column 1, line 3, in the Title, change "Paticulary" to --Particularly--

In the Specification

Column 6, line 38, change "501" to --50I--

Column 6, line 53, change "501" to --50I--

Column 6, line 61, change "501" to --50I--

Column 6, line 64, change "501" to --50I--

Column 7, line 3, change "501" to --50I--

Column 7, line 7, change "501" to --50I--

Column 7, line 13, change "501" to --50I--

Column 8, line 4, change "501" to --50I--

Column 8, line 54, change "901" to --90I--

Column 8, line 64, change "901" to --90I--

Signed and Sealed this
Twenty-second Day of October, 2013

Teresa Stanek Rea
*Deputy Director of the United States Patent and Trademark Office*